(12) United States Patent
Kani et al.

(10) Patent No.: US 7,043,136 B2
(45) Date of Patent: May 9, 2006

(54) PROGRAM LENGTH EXTENDING OR SHORTENING DEVICE AND METHOD, AND PROGRAM LENGTH ADJUSTING SYSTEM

(75) Inventors: Tetsuo Kani, Kanagawa (JP); Shinichi Morishima, Kanagawa (JP); Yoshiaki Tanaka, Kanagawa (JP); Toru Suzuki, Kanagawa (JP); Mitsutoshi Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1148 days.

(21) Appl. No.: 09/827,465

(22) Filed: Apr. 6, 2001

(65) Prior Publication Data

US 2001/0055468 A1  Dec. 27, 2001

(30) Foreign Application Priority Data

Apr. 7, 2000 (JP) .............................. 2000-107067

(51) Int. Cl.
*H04N 5/93* (2006.01)
(52) U.S. Cl. .............................. 386/52; 386/67; 386/68
(58) Field of Classification Search .................. 386/46, 386/52, 65, 67, 68, 83
See application file for complete search history.

(56) References Cited

U.S. PATENT DOCUMENTS

| 5,731,922 A | * | 3/1998 | Yamasaki et al. .............. 360/53 |
| 5,754,728 A | * | 5/1998 | Nakajima et al. .............. 386/68 |
| 5,841,939 A | * | 11/1998 | Takahashi et al. ............ 386/68 |

* cited by examiner

*Primary Examiner*—Huy Nguyen
(74) *Attorney, Agent, or Firm*—Frommer Lawrence & Haug LLP; William S. Frommer; Thomas F. Presson

(57) ABSTRACT

A program length extending or shortening device for extending or shortening the program length in a digital video tape recorder of the image information compression recording method. The device comprises storage means for storing an image of a material video program reproduced and supplied from a predetermined recording medium by a reproducing device, and extending or shortening control means for extending or shortening the program length of the material video program to produce a target video program by skipping or reading duplicately the image of the material video program from the storage means in accordance with a program length extending or shortening ratio N based on the program lengths of the material video program and the target video program. According to the present invention, the program length can be freely extended or shortened using storage means of a small capacity while the recording device is being operated at a normal rate.

11 Claims, 12 Drawing Sheets

PROGRAM LENGTH EXTENDING OR SHORTENING DEVICE AND METHOD, AND PROGRAM LENGTH ADJUSTING SYSTEM

BACKGROUND OF THE INVENTION

1. Field of the Invention

The present invention relates to a program length extending or shortening device and method, and a program length adjusting system, and more particularly to a program length adjusting system for adjusting the program length of a video program recorded on, for example, a magnetic tape, to an arbitrary length.

2. Description of the Related Art

In the conventional television station, a video tape recorder with a function of extending or shortening and adjusting the time length of a television program (hereinafter referred to as a program length) in accordance with the length of a commercial to be inserted was utilized.

Herein, the conventional video tape recorder of, for example, the analog recording method, records the image information in a unit of field on every recording track. Also, the digital video tape recorder of D-2 format records the image information in a unit of field on every plural recording tracks. Therefore, these video tape recorders allow the image information to be read and reproduced in a unit of field.

In such a video tape recorder for reading and reproducing the image information in a unit of field, a reproducing head unit is provided in which the tape run speed is controlled to be increased or decreased in accordance with a program length extending or shortening ratio, and the angle of incidence of the reproducing head is controlled to be deflected so that the head scan may follow the recording track, and a program play function is implemented by reading the image twice in a unit of field (two scans of recording track) or skipping the image in a unit of field (skip scan of recording track) in accordance with the increased or decreased tape run speed, using the reproducing head unit.

By the way, in recent years, a digital video tape recorder of the image information compression recording method has been used in which the recorded image information is compressed in the direction of time axis to enhance the recording efficiency.

In this digital video tape recorder of the image information compression recording method, the image information is compressed in a unit of frame (two fields), using a correlation between the fields, for example, and the compressed image information is recorded in a unit of frame on plural recording tracks. In the digital video tape recorder of such image information compression recording method, the compressed image can not be decoded unless the image is read by a unit of frame (two fields) or more from the recording tracks.

Therefore, with the digital video tape recorder of the image information compression recording method, there is a problem that if the program play function is performed by the reproducing head unit with the control of increasing or decreasing the tape run speed, the read compressed image is excessive or deficient by reading twice or skipping the recording track owing to the increased or decreased tape run speed, and may not be decoded.

For this reason, the digital video tape recorder of the image information compression recording method has no program play function and is desired to have the program play function.

SUMMARY OF THE INVENTION

In view of the foregoing, an object of this invention is to provide a program length extending or shortening device, a program length extending or shortening method and a program length adjusting system, in which the program length can be extended or shortened in the digital video tape recorder of the image information compression recording method.

The foregoing object and other objects of the invention have been achieved by the provision of a program length extending or shortening device for extending or shortening the program length of a material video program to produce a target video program, characterized by comprising storage means for storing an image of the material video program reproduced and supplied from a predetermined recording medium by a reproducing device, and extending or shortening control means for extending or shortening the program length of the material video program to produce the target video program by skipping or reading duplicately an image of the material video program from the storage means in accordance with a program length extending or shortening ratio that is based on the program lengths of the material video program and said target video program.

The program length can be securely extended or shortened while the reproducing device and the recording device is being operated at a normal rate by storing the material video program in the storage means and skipping or reading duplicately an image of the material video program from the storage means in accordance with a program length extending or shortening ratio set value.

Also, the program length is extended or shortened in a unit of editing by setting the number of images contained in the unit of editing such that the amount of extending or shortening the program length per unit of editing is equal to or less than the capacity of storage means. Hence, the program length can be freely extended or shortened using storage means of a small capacity.

Also, the speed of the reproducing device is controlled so as to start reproducing the image in a unit of edit at a reproduction start timing based on the count value of a reproducing reference timer, and the speed of recording means is controlled so as to start recording the image in the unit of editing at a recording start timing based on the count value of a recording reference timer. Hence, the program length can be securely extended or shortened by synthesizing the reproduction with the recording in the unit of editing.

The extending or shortening control means calculates a remaining set value on the basis of two input set values among three set values of the start time, the end time and the program length of the material video program, calculates a remaining set value on the basis of two input set values among three set values of the start time, the end time and the program length of the target video program, and calculates the program length extending or shortening ratio on the basis of the program length of the material video program and the target video program that are calculated. Hence, the program can be extended or shortened with a simple operation.

Also, a reference time code corresponding to the extended or shortened target video program is generated, and the additional information supplied from predetermined additional information supplying means at a timing corresponding to the reference time code is synthesized with said target video program. Hence, the additional information can be securely synthesized with the target video program at a timing corresponding to the extended or shortened program length.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
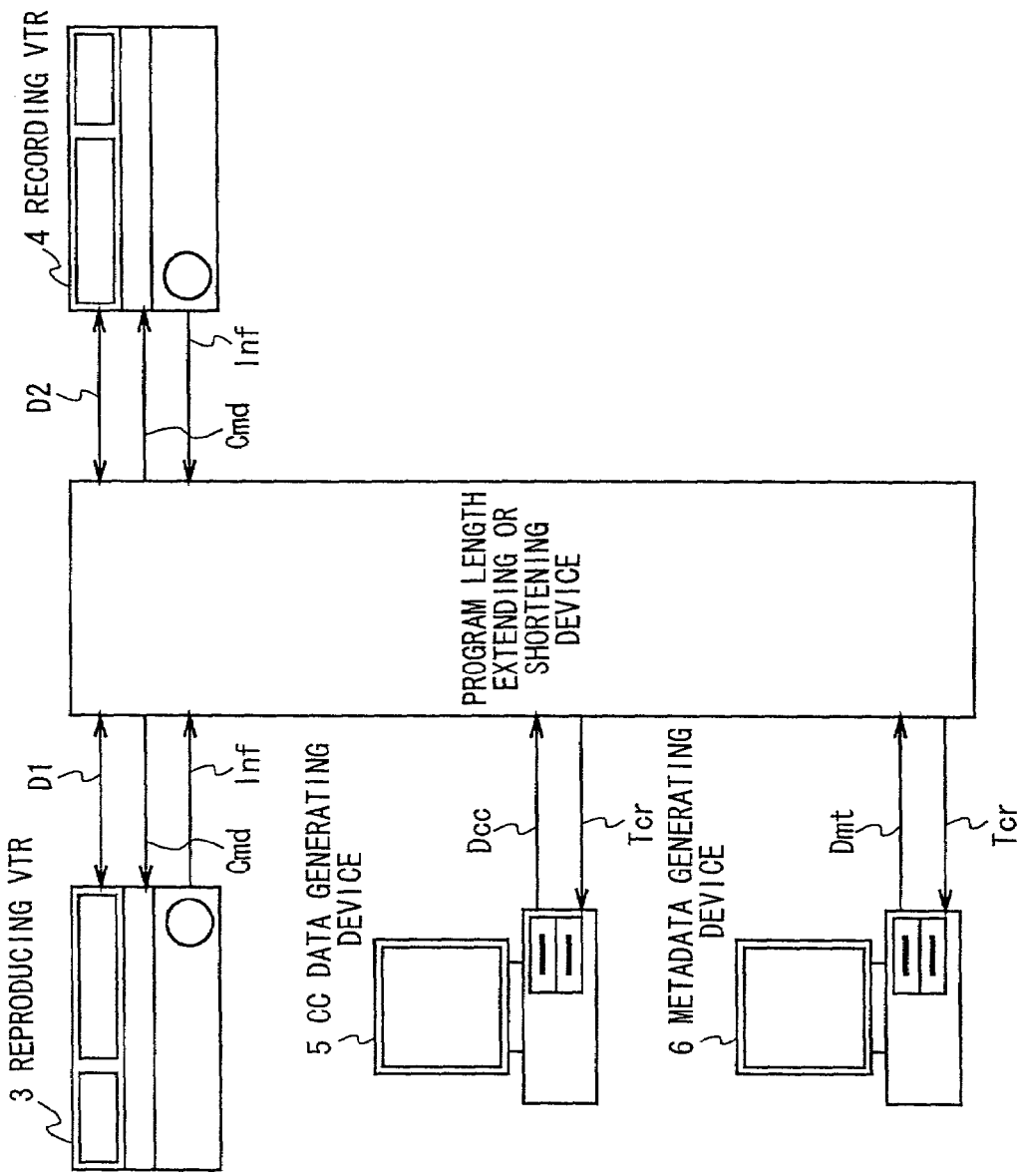
FIG. 1 is a block diagram showing the overall configuration of a program length adjusting system according to the present invention.

Preferred embodiments of this invention will be described with reference to the accompanying drawings:

(1) Configuration of Program Length Adjusting System (1-1) Overall Configuration of Program Length Adjusting System In FIG. 1, reference numeral 1 denotes a program length adjusting system, as a whole, according to the present invention. The program length adjusting system 1 comprises a program length extending or shortening device 2 that is connected to a reproducing Video Tape Recorder (VTR) 3, a recording VTR 4, a closed caption data generating device 5 and a metadata generating device 6.

The reproducing VTR 3 and the recording VTR A are digital VTRs for compressing and processing the video signal in a unit of frame.

The reproducing VTR 3 reproduces a material video tape (not shown) recording a material program at a normal reproducing speed in accordance with a control command Cmd sent from the program length extending or shortening device 2 to produce a reproduced signal D1 having a video signal, a voice signal and a reference signal multiplexed in accordance with the Serial Digital Interface (SDI) standards, the reproduced signal D1 being then supplied to the program length extending or shortening device 2.

The program length extending or shortening device 2 extends or shortens the program length of a material program by increasing or decreasing the number of frames for the video signal in the reproduced signal D1 on the basis of a preset program length extending or shortening ratio N, to produce a recording signal D2 in accordance with the SDI standards.

Then, the program length extending or shortening device 2 produces a reference time code Tcr corresponding to the extended or shortened program length, and supplies it to the closed caption data generating device 5 and the metadata generating device 6.

The closed caption data generating device 5, which is a so-called personal computer, supplies in succession the closed caption data (caption data that can be displayed on the screen and erased by the user's operation) Dcc creased in advance in accordance with the program contents of the material program to the program length extending or shortening device 2 at a timing based on the reference time code Tcr. Similarly, the metadata generating device 6, which is also a personal computer, supplies in succession the metadata (additional data regarding the program such as the copyright holder, staff name, production date, and cut name for the program) Dmt to the program length extending or shortening device 2 at a timing based on the reference time code Tcr.

The program length extending or shortening device 2 synthesizes the closed caption data Dcc and the metadata Dmt supplied with a video signal in a recording signal D2 during a blanking interval, and supplies a synthesized signal to the recording VTR 4. The recording VTR 4 records the recording signal D2 on a target video tape (not shown) mounted at a normal recording speed in accordance with a control command Cmd supplied from the program length extending or shortening device 2.

Thus, the program length adjusting system 1 adjusts the program length of the material program, and synthesizes the closed caption data Dcc and the metadata Dmt at a new timing corresponding to the adjusted program length to record on the target video tape.

(1-2) Constitution of Program Length Extending or Shortening Device

Figure 2:
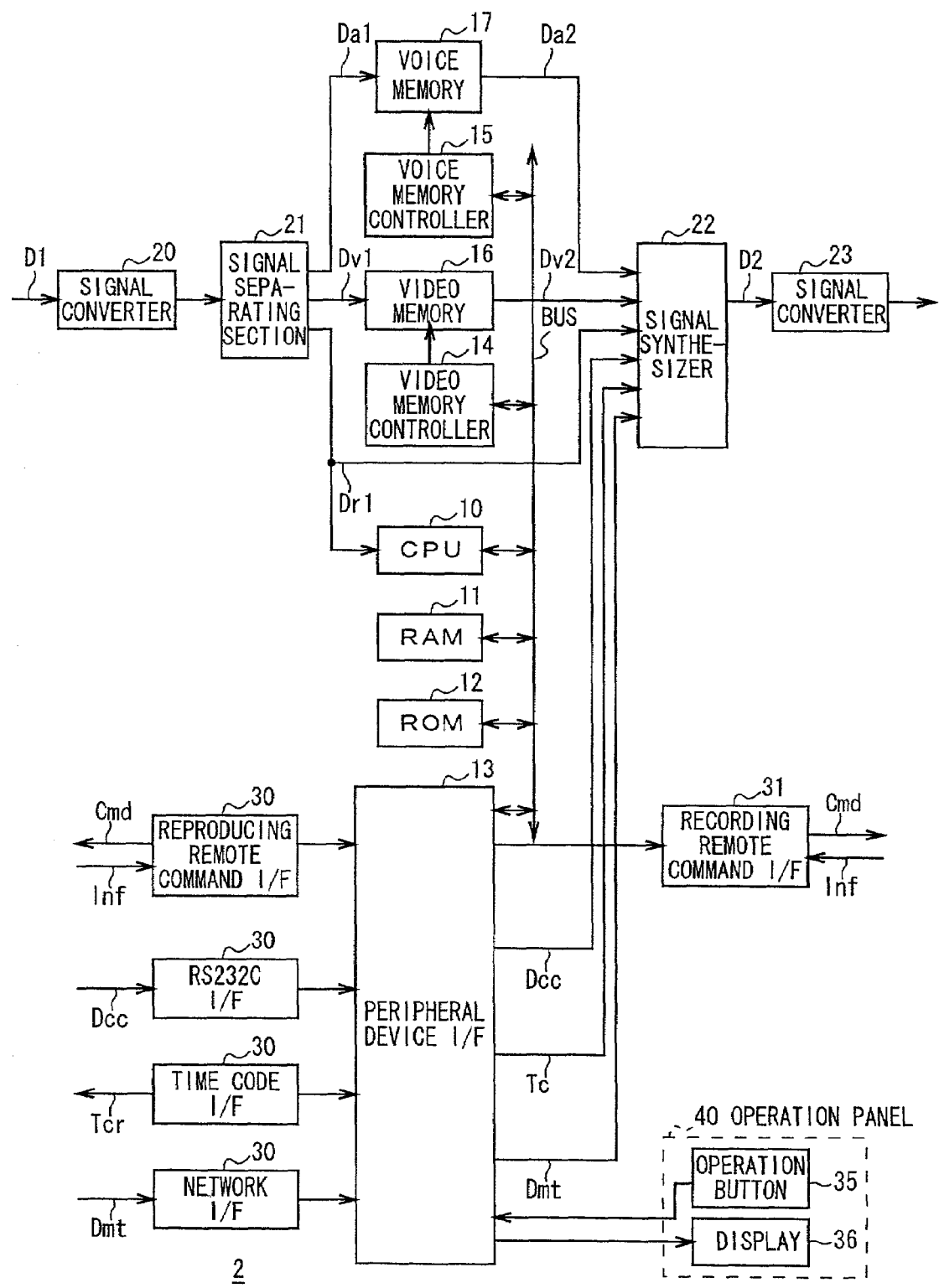
FIG. 2 is a block diagram showing the circuit configuration of a program length extending or shortening device.

Referring now to FIG. 2, the constitution of the program length extending or shortening device 2 will be described below.

In the program length extending or shortening device 2, a Central Processing Unit (CPU) 10 for controlling the program length extending or shortening device 2 as a whole is connected via a bus BUS to a Random Access Memory (RAM) 11, a Read Only Memory (ROM) 12, a peripheral device interface 13, a video memory controller 14 and a voice memory controller 15. The CPU 10 controls each section of the program length extending or shortening device 2 by reading a program length extending or shortening program stored in the ROM 12, and developing and executing it on the RAM 11.

To the peripheral device interface 13, there are connected a reproducing remote command interface 30, a recording remote command interface 31, an RS232C interface 32, a time code interface 33, a network interface 34, an operation button 35 and a display unit 36.

The CPU 10 controls the operation of the reproducing VTR 3 by sending a control signal Cmd via the reproducing remote command interface 30, and inputs the operation state information Inf from the reproducing VTR 3. Similarly, the CPU 10 controls the operation of the recording VTR 4 by sending a control signal Cmd via the recording remote command interface 31, and inputs the operation state information Inf from the recording VTR 4.

The time code interface 33 supplies the reference time code Tcr supplied from the CPU 10 to the closed caption data generating device 5 and the metadata generating device 6.

The RS232C interface 32 supplies the closed caption data Dcc according to the reference time code Tcr supplied appropriately from the closed caption data generating device 5 via the peripheral device interface 13 to the signal synthesizer 22. Similarly, the network interface 34 supplies the metadata Dmt according to the reference time code Tcr supplied appropriately from the metadata generating device 6 to the signal synthesizer 22.

On one hand, a signal converter 20 converts a reproducing signal D1 composed of a serial signal in accordance with the SDI standards supplied from the reproducing VTR 3 into a parallel signal of 10 bits, which is then supplied to a signal separating section 21.

The signal separating section 21 separates an input reproducing signal D1 into a voice signal Da1, a video signal Dv1 and a reference signal Dr1. And the signal separating section 21 stores the voice signal Da1 in a voice memory 17, stores the video signal Dv1 in a video memory 16, and supplies the reference signal Dr1 to the CPU 10 and the signal synthesizer 22.

The CPU 10 reads in succession, under the video memory controller 14, the video signal Dv1 stored in the video memory 16 in a unit of frame in synchronism with a predetermined field frequency, and supplies it as the video signal Dv2 to the signal synthesizer 22. At this time, the CPU 10 reads twice or skips the frames at the preset program length extending or shortening ratio N in accordance with a program length extending or shortening procedure as will be described later, thereby increasing or decreasing the number of frames in the video signal Dv2, and extending or shortening the overall length (i.e., program length) of the video signal Dv2.

Concurrently, the CPU 10 reads, under the voice memory controller 15, the voice signal Da1 stored in the voice memory 17 in synchronism with the video signal Dv2 to supply it as a voice signal Da2 to the signal synthesizer 22, and generates a new time code Tc corresponding to the extended or shortened video signal Dv1 to supply it via the peripheral device interface 13 to the signal synthesizer 22.

The signal synthesizer 22 synthesizes the time code Tc and the closed caption data Dcc in a vertical blanking interval of the video signal Dv2, and further synthesizes the video signal Dv2, the voice signal Da2 and the reference signal Dr1 to produce a recording signal D2, which is then supplied to the signal converter 23.

The signal converter 23 converts the recording signal D2 composed of a parallel signal of 10 bits into a serial signal in accordance with the SDI standards and supplies it to the recording VTR 4 (FIG. 1).

(2) Inputting the set Values and Calculating the Program Length Extending or Shortening Ratio In the program length adjusting system 1, the program length of a material program is extended or shortened at a program length extending or shortening ratio N calculated on the basis of the program lengths of the material program and a program after adjustment of the program length (hereinafter referred to as a target program) that are input in advance employing an operation panel 40 provided on the program length extending or shortening device 2.

Figure 3:
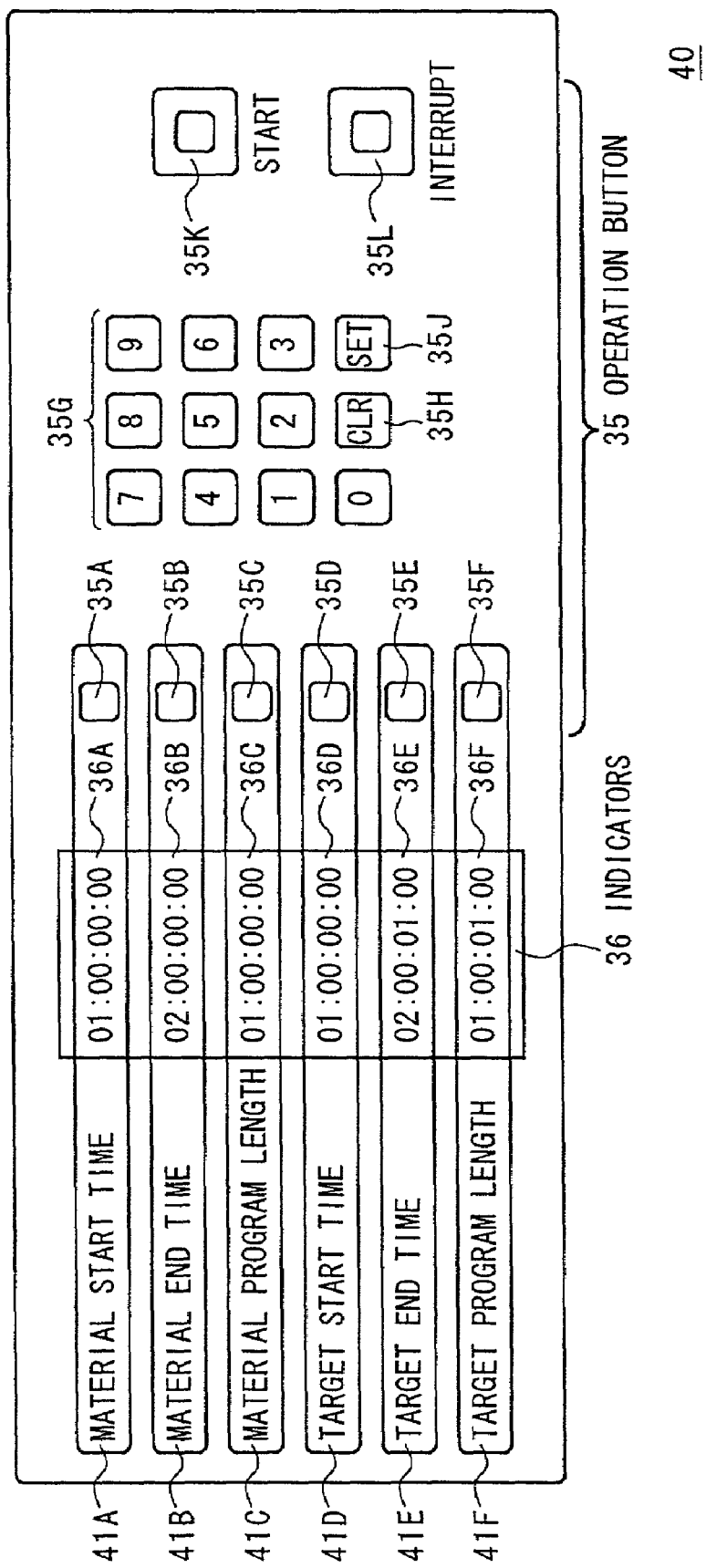
FIG. 3 is a schematic view showing the configuration of an operation panel.

FIG. 3 shows the operation panel 40 as a whole, which is provided with an operation button 35 and a display 36. On the left side of the operation panel 40, there are provided a material start time setting area 41A, a material end time setting area 41B, a material program length setting area 41c, a target start time setting area 41D, a target end time setting area 41E and a target program length setting area 41F. And in the setting areas 41A to 41F, the set value indicators 36A to 36F for indicating the set value and the setting buttons 35A to 35F for starting the input of the set value are provided respectively.

Also, a ten key 35G for entering the set value, a clear button 35H for clearing the input set value and a set button 35J for deciding and storing the input set value in the RAM 11 (FIG. 2) are provided in the central region of the operation panel 40. And a start button 35K for starting the program length extending or shortening process and an end button 35L for interrupting and compulsorily ending the program length extending or shortening process are provided on the right side of the operation panel 40.

If any of the setting buttons 35A to 35F is pressed, the program length extending or shortening device 2 starts an input process of the set value corresponding to the pressed set button.

Herein, the program length extending or shortening device 2 is configured to automatically calculate a remaining set value by inputting two set values among three set values of the start time, the end time and the program length for each of the material program and the target program. And the program length extending or shortening device 2 is configured to automatically calculate the program length extending or shortening ratio N on the basis of the material program length and the target program length that are input.

Figure 4:
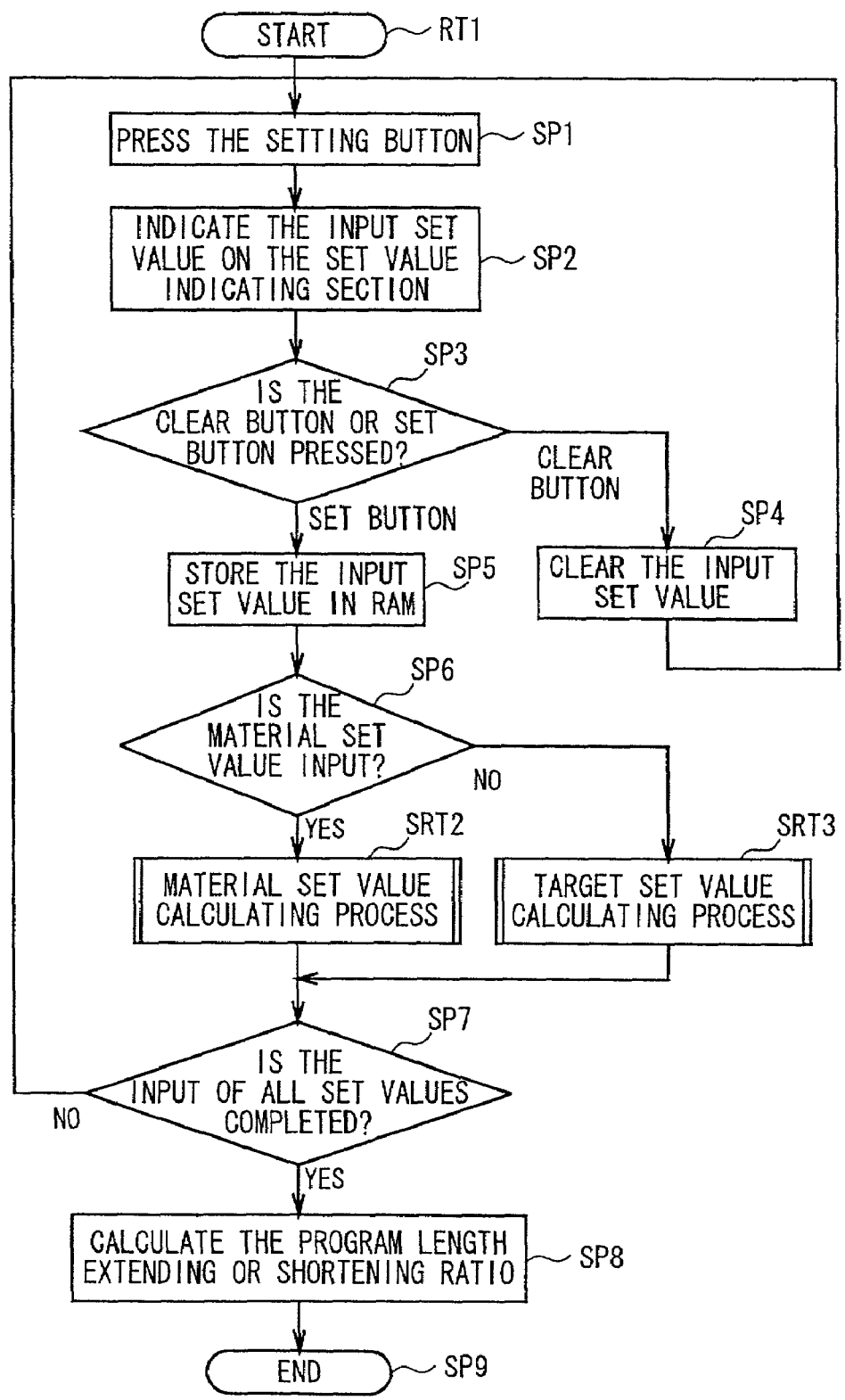
FIG. 4 is a flowchart showing a set value input processing procedure.

That is, in a set value input processing procedure as shown in FIG. 4, the program length extending or shortening device 2 enters a start step of a routine RT1 to go to step SP1. If the CPU 10 confirms that any of the setting buttons 35A to 35F has been pressed at step SP1, the routine transfers to the next step SP2.

At step SP2, the CPU 1 indicates the set values (start time, end time or program length for the material program or target program) input via the ten key 35G on the set value indicators 36A to 36F corresponding to the setting buttons 35A to 35F that have been pressed. Then the routine transfers to the next step SP3.

At step SP3, the CPU 10 determines which of the clear button 35H and the set button 35J is pressed.

If the CPU 10 determines at step SP3 that the clear button 35H has been pressed, the routine transfers to step SP4 for clearing the indications on the set value indicators 36A to 36F, and returns to step SP1.

On the other hand, if the CPU determines at step SP3 that the set button 35J has been pressed, the routine transfers to step SP5 for storing the input set value in the RAM 11, and then transfers to the next step SP6.

At step SP6, the CPU 10 determines whether or not the input set value is the material set value (material start time Tms, material end time Tme or material program length Tm1). If an affirmative result is obtained at step SP6, this means that the input set value is the material set value, in which the CPU 10 performs a material set value calculating procedure of a subroutine SRT2.

Figure 5:
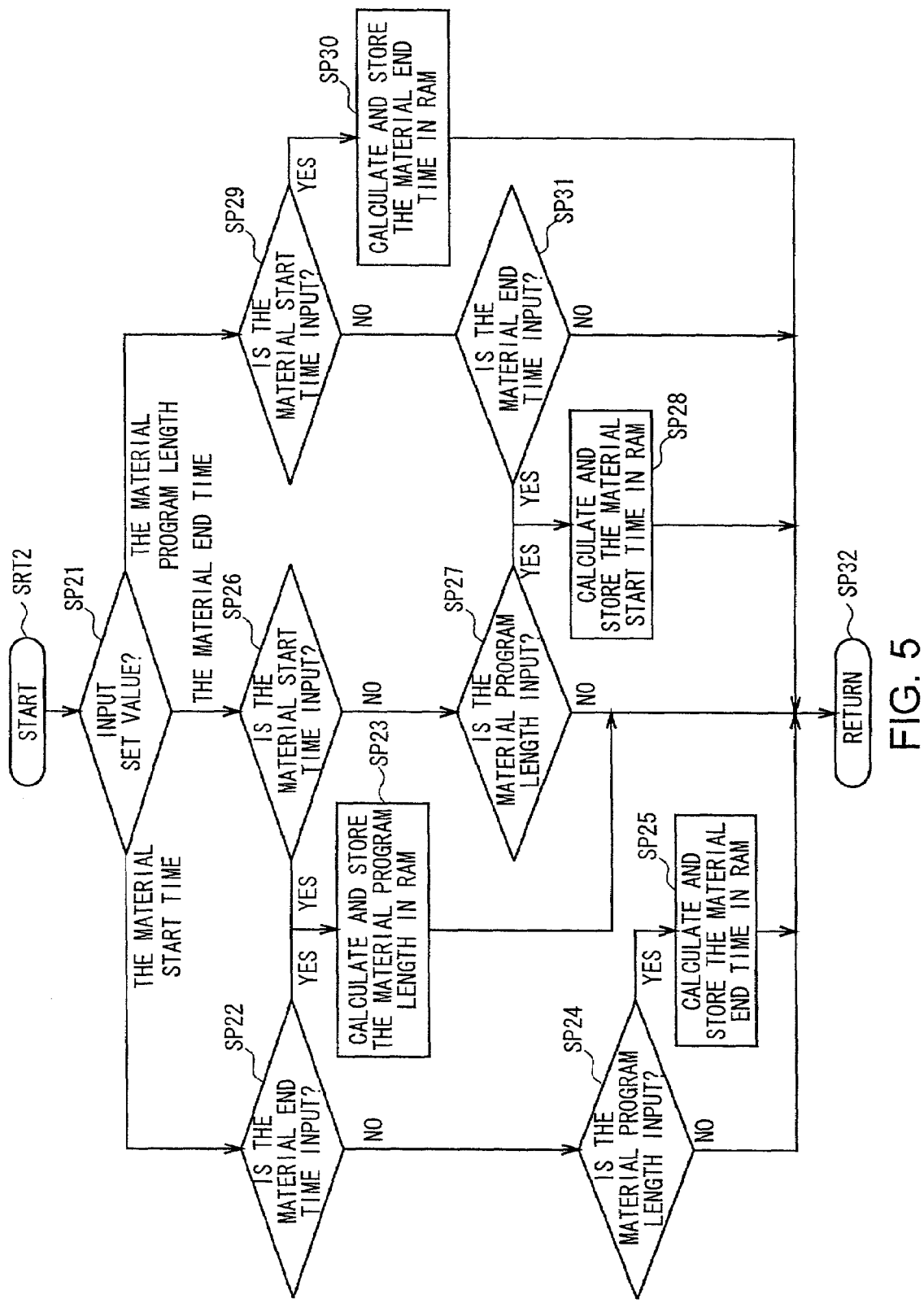
FIG. 5 is a flowchart showing a material set value calculating procedure.

In the material set value calculating procedure as shown in FIG. 5, the CPU 10 enters a start step of the subroutine SRT2 to go to step SP21.

At step SP21, the CPU 10 determines which of the material start time Tms, the material end time Tme and the material program length Tm1 is the input set value.

If the CPU 10 determines at step SP21 that the input item is the material start time Tms, the routine transfers to step SP22.

At step SP22, the CPU 10 determines whether or not the material end time Tme has been input by referring to the RAM 11.

If an affirmative result is obtained at step SP22, this means that the material end time Tme is stored in the RAM 11 and has been input. Then the CPU 10 transfers to step SP23 for calculating the material program length Tm1 on the basis of the material start time Tms and the material end time Tme and storing it in the RAM 11. At step SP32, the CPU 10 returns to the set value input processing procedure (FIG. 4) at step SP7.

On the other hand, if a negative result is obtained at step SP22, this means that the material end time Tme is not stored in the RAM 11, and has not been input, in which the CPU 10 transfers to step SP24.

At step SP24, the CPU 10 determines whether or not the material program length Tm1 has been input by referring to the RAM 11.

If an affirmative result is obtained at step SP24, this means that the material program length Tm1 is stored and has been input. Then the CPU 10 transfers to step SP25 for calculating the material end time Tme on the basis of the material start time Tms and the material program length Tm1 and storing it in the RAM 11. Then, at step SP32, the subroutine returns to the set value input processing procedure (FIG. 4) at step SP7.

On the contrary, if a negative result is obtained at step S24, this means that the material program length Tm1 has not been input, in which the CPU 10 transfers to step SP32 without calculating the material end time Tme. Then, the CPU 10 returns to the set value input processing procedure at step SP7.

On the other hand, if the CPU 10 determines at step SP21 that the input item is the material end time Tme, the routine transfers to step SP26.

At step SP26, the CPU 10 determines whether or not the material start time Tms has been input by referring to the RAM 11.

If an affirmative result is obtained at step SP26, this means that the material start time Tms has been input. Then the CPU 10 transfers to step SP23 for calculating the material program length Tm1 on the basis of the material start time Tms and the material end time Tme and storing it in the RAM 11. Then, at step SP32, the CPU 10 returns to the set value input processing procedure at step SP7.

On the contrary, if a negative result is obtained at step S26, this means that the material start time Tms has not been input, and the CPU 10 transfers to step SP27.

At step SP27, the CPU 10 determines whether or not the material program length Tm1 has been input by referring to the RAM 11.

If an affirmative result is obtained at step SP27, this means that the material program length Tm1 has been input. Then the CPU 10 transfers to step SP28 for calculating the material start time Tms on the basis of the material end time Tme and the material program length Tm1 and storing it in the RAM 11. Then, at step SP32, the CPU 10 returns to the set value input processing procedure at step SP7.

On the contrary, if a negative result is obtained at step S27, this means that the material program length Tm1 has not been input, in which the CPU 10 transfers to step SP32 without calculating the material start time Tms. Then, the CPU 10 returns to the set value input processing procedure at step SP7.

If it is determined at step SP21 that the input item is the material program length Tm1, the CPU 10 transfers to step SP29.

At step SP29, the CPU 10 determines whether or not the material start time Tms has been input by referring to the RAM 11.

If an affirmative result is obtained at step SP29, this means that the material start time Tms has been input. Then the CPU 10 transfers to step SP30 for calculating the material end time Tme on the basis of the material start time Tms and the material program length Tm1 and storing it in the RAM 11. Then, at step SP32, the CPU 10 returns to the set value input processing procedure at step SP7.

On the contrary, if a negative result is obtained at step S29, this means that the material start time Tms has not been input, in which the CPU 10 transfers to step SP31.

At step SP31, the CPU 10 determines whether or not the material end time Tme has been input by referring to the RAM 11.

If an affirmative result is obtained at step SP31, this means that the material end time Tme has been input. Then the CPU 10 transfers to step SP28 for calculating the material start time Tms on the basis of the material end time Tme and the material program length Tm1 and storing it in the RAM 11. Then, at step SP32, the CPU 10 returns to the set value input processing procedure at step SP7.

On the contrary, if a negative result is obtained at step S31, this means that the material end time Tme has not been input, in which the CPU 10 transfers to step SP32 without calculating the material start time Tms. Then the CPU 10 returns to the set value input processing procedure at step SP7.

In this way, the program length extending or shortening device 2 is able to calculate a remaining set value only by inputting two set values among the material start time Tms, the material end time Tme and the material program length Tm1 in accordance with the material set value calculating procedure.

At step SP6 in the set value input processing procedure as shown in FIG. 4, if a negative result is obtained, this means that the input set value is the target set value (target start time Tns, target end time Tne or target program length Tn1). The CPU 10 executes a subroutine SRT3 of a target set value calculating procedure, and then transfers to the next step SP7.

This target set value calculating procedure (SRT3), like the material set value calculating procedure (SRT2) as shown in FIG. 5, is able to calculate a remaining set value only by inputting two set values among the target start time Tns, the target end time Tne and the target program length Tn1.

At step SP7, the CPU 10 determines whether or not all the input of the material set values and the target set values has been completed.

If a negative result is obtained at step SP7, this means that the input of the material set values and the target set values has not been completed. The CPU 10 gets backs to step SP1 to repeat the above procedure.

On the other hand, if an affirmative result is obtained at step SP7, this means that the input of the material set values and the target set values has been completed. Then the CPU 10 transfers to the next step SP8.

At step SP8, the CPU 10 calculates the program length extending or shortening ratio N on the basis of the material program length Tm1 and the target program length Tn1, and stores it in the RAM 11. At step SP9, the procedure is ended.

Herein, the program length extending or shortening ratio N can be obtained in accordance with an expression as follows.

$$N=(Tn1-Tm1)/Tm1 \qquad (1)$$

(3) Program Length Extending or Shortening Process (3-1) Extending or Shortening the Program Length and Edit Block As above described, in the program length extending or shortening system 1, the program length is extended or shortened by once storing a video signal Dv1 of the material program in the video memory 16, and reading an increased or decreased number of frames according to the program length extending or shortening ratio N from the video memory 16.

Generally, when the program length is extended or shortened, it is considered that all the material programs are once stored in the video memory 16, and read out after completion of storage. In this case, however, there is a problem that the required capacity of the video memory 16 may be increased in accordance with the program length.

Therefore, in the program length extending or shortening device 2 of the invention, the program length is extended or shortened in a unit of editing (called an edit block) in accordance with the capacity of the video memory 16 and the program length extending or shortening ratio N, employing the video memory 16 with a smaller capacity (e.g., by 10 seconds, 300 frames) than the program length. At this time, the length of edit block is chosen so that the extending or shortening amount per edit block (or the increased or decreased number of frames) may be within the memory capacity (or the number of storable frames) of the video memory 16.

Figure 6:
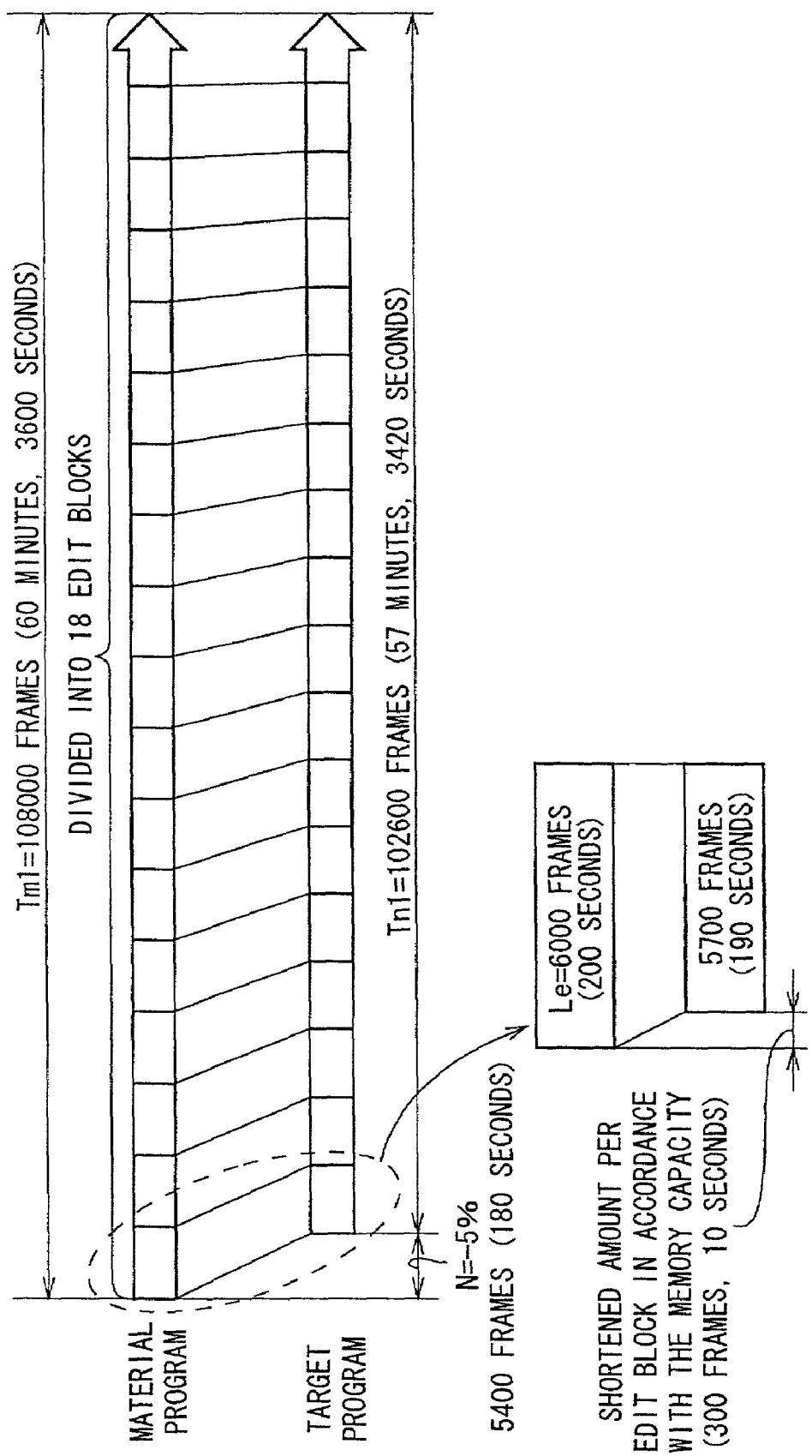
FIG. 6 is a schematic diagram showing the relation between a shortened program length and an edit block.

For example, supposing that the material program length Tm1 is 108000 frames (60 minutes, 3600 seconds), the program length extending or shortening ratio N is −5% (shortened by 5400 frames, 180 seconds), and the memory capacity Mem of the video memory 16 is 300 frames (10 seconds), as shown in FIG. 6, the edit block length Le is 6000 frames at maximum.

The CPU 10 in the program length extending or shortening device 2 controls the reproducing VRT 3 to reproduce the material program by one edit block to store successively a video signal Dv1 in the video memory 16, and successively skip or read twice the video signal Dv1 stored in the video memory 16 at the program length extending or shortening ratio N to supply a video signal Dv2 to the signal synthesizer 22.

Figure 7:
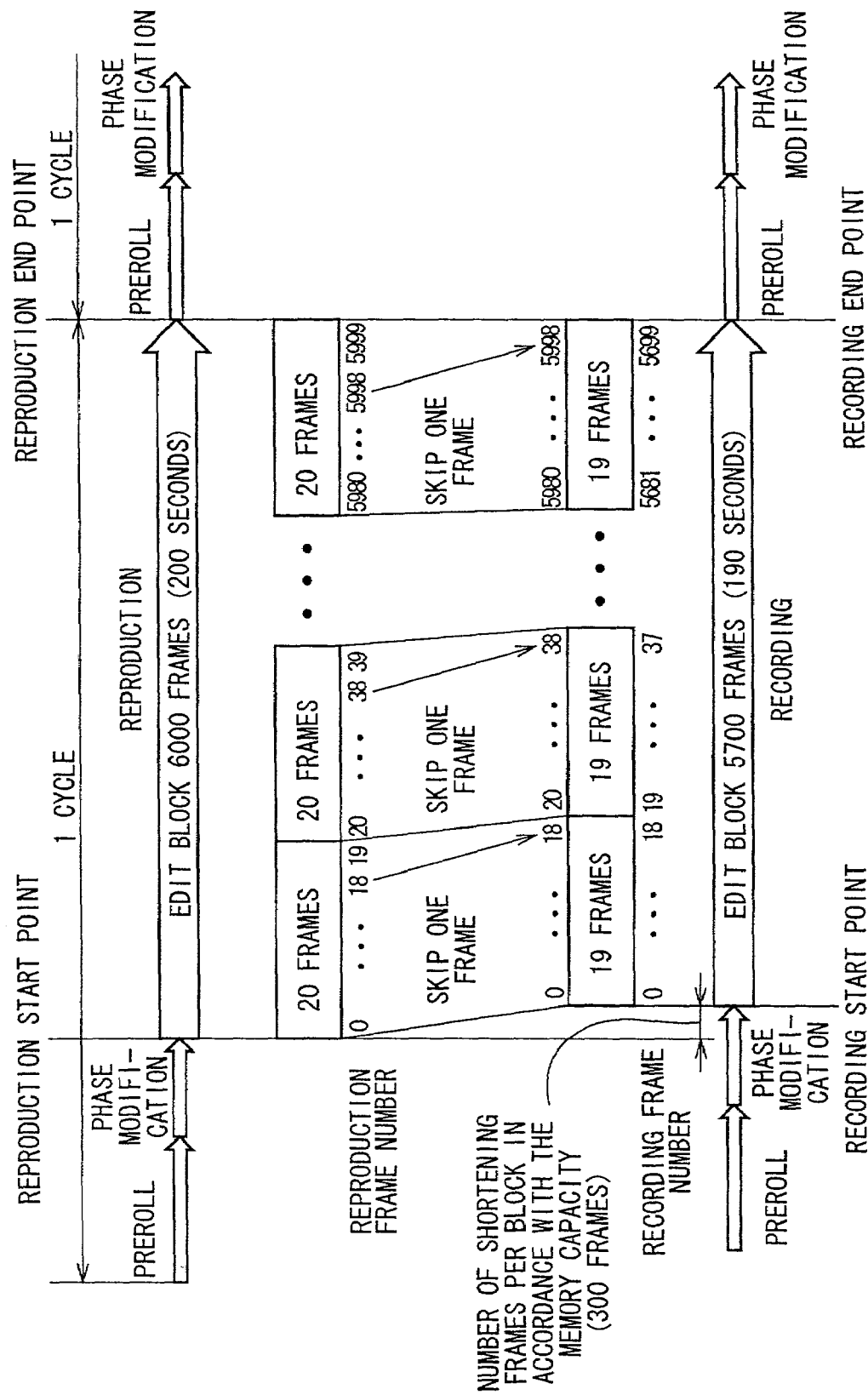
FIG. 7 is a schematic diagram showing a shortened state of the program length.

For example, supposing that the program length extending or shortening ratio N is −5%, the CPU 10 skips the frame at a rate of one frame for every twenty frames, thereby shortening 300 frames per edit block (6000 frames), as shown in FIG. 7.

Figure 8:
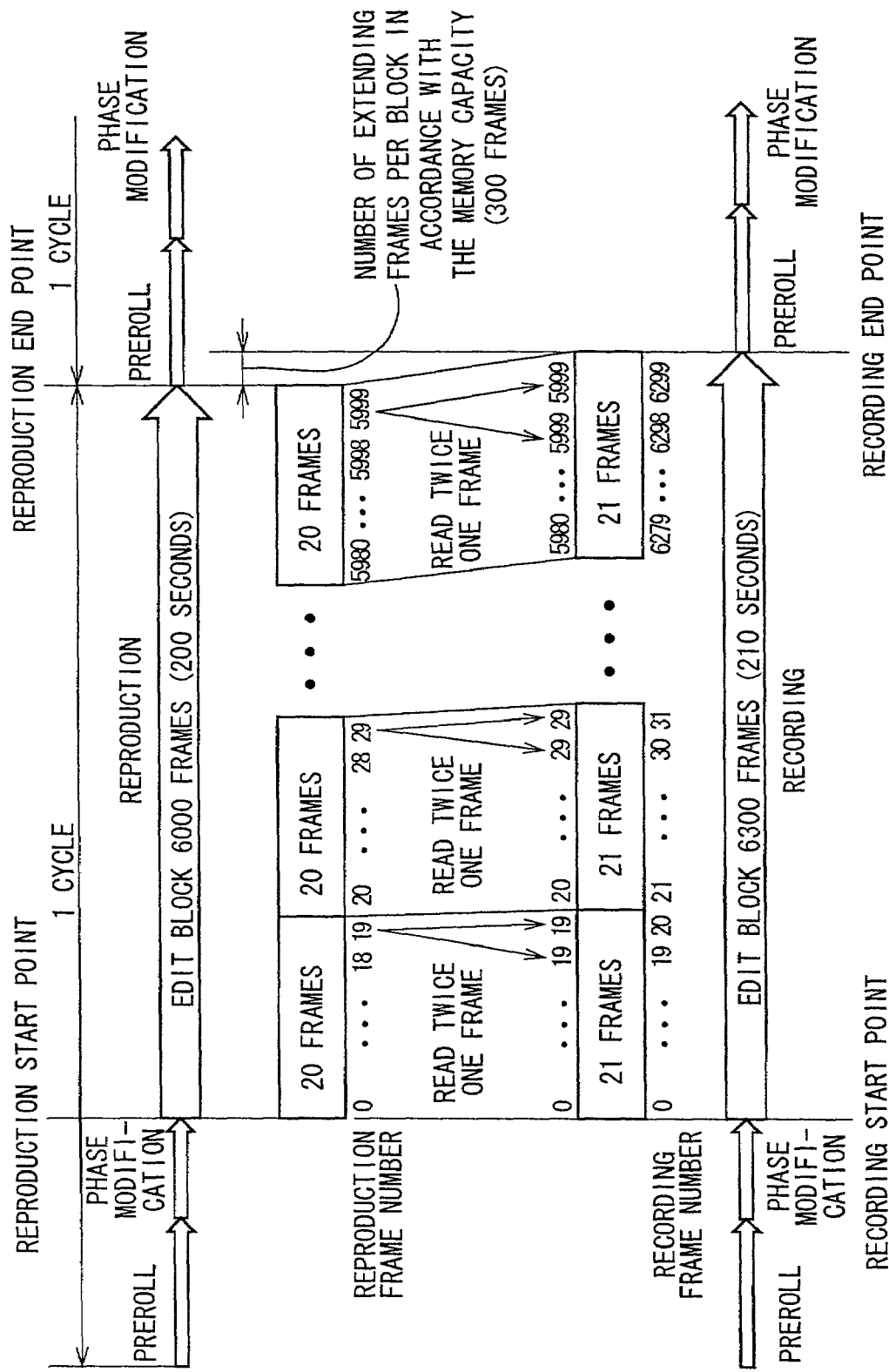
FIG. 8 is a schematic diagram showing an extended state of the program length.

Also, supposing that the program length extending or shortening ratio N is +5%, the CPU 10 reads twice the frame at a rate of one frame for every twenty frames, thereby extending 300 frames per edit block (6000 frames), as shown in FIG. 8.

The signal synthesizer 22 synthesizes the video signal Dv2, the voice signal Da2, the reference signal Dr1, the time code Tc and the closed caption data Dcc, and supplies a synthesized signal as a recording signal D2 via the signal converter 23 to the recording VTR 4.

The CPU 10 of the program length extending or shortening device 2 controls the recording VTR 4 to record the recording signal D2 on a target video tape for every edit block.

(3-2) Phase Modification Process

To extend or shorten the program length for every edit block, it is necessary to synchronize the reproduction of edit blocks on the reproducing VTR 3 and the recording of edit blocks on the recording VTR 4.

For example, in a program length shortening process as shown in FIG. 7, it is required to control the reproducing VTR 3 and the recording VTR4 so that a reproduction end point of edit blocks on the reproducing VTR 3 and a recording end point of edit blocks on the recording VTR 4 occur at the same time. In a program length extending process as shown in FIG. 8, it is required to control the reproducing VTR 3 and the recording VTR4 so that a reproduction start point of edit blocks on the reproducing VTR 3 and a recording start point of edit blocks on the recording VTR 4 occur at the same time. Such a synchronization control for the reproducing VTR 3 and the recording VTR 4 is called a phase modification.

Prior to this phase modification, the CPU 10 of the program length extending or shortening device 2 performs a preroll of rewinding the reproducing VTR 3 and the recording VTR 4 back to a predetermined time (e.g., 5 seconds, 150 frames) before the reproduction start point and the recording start point respectively.

Figure 9:
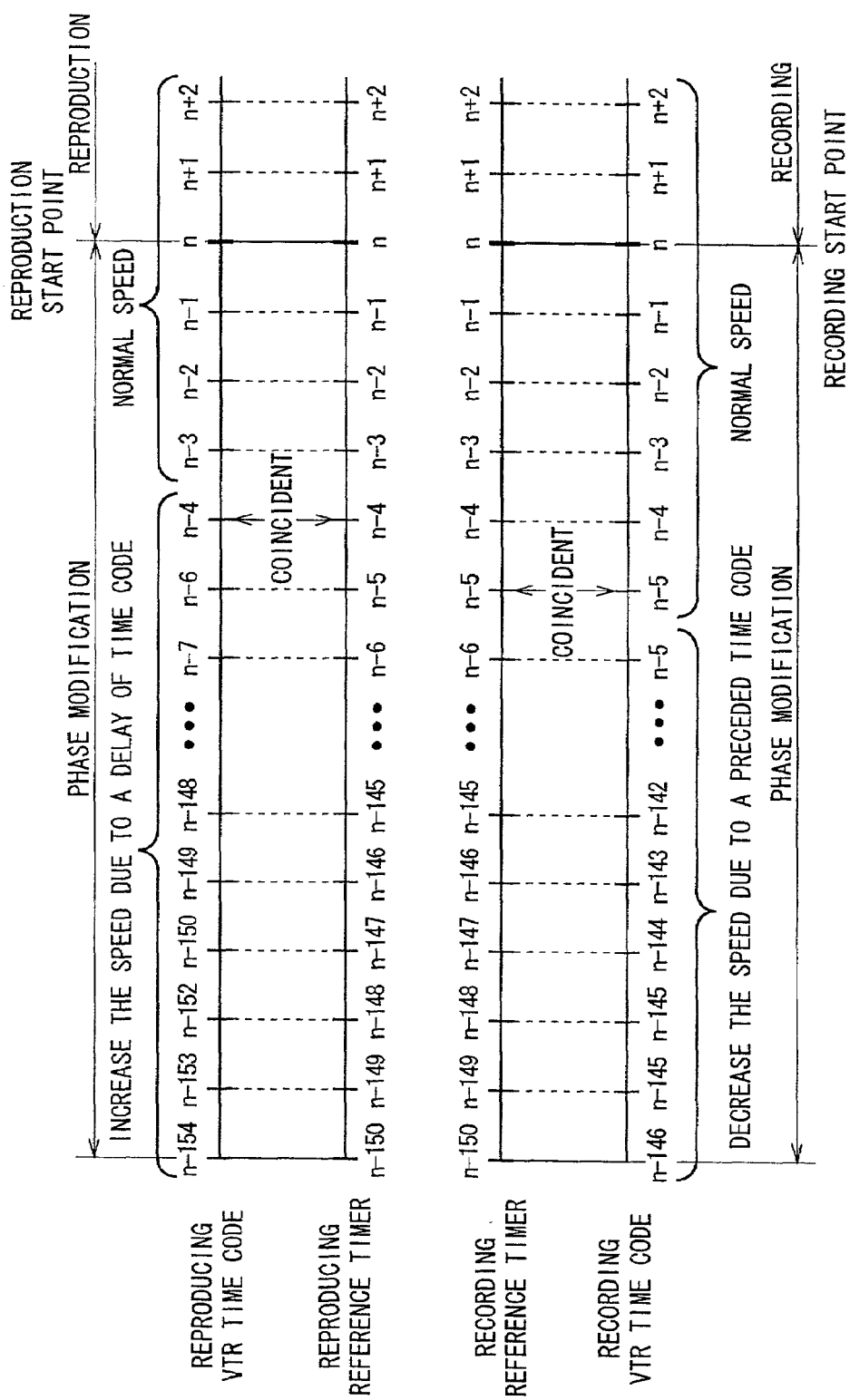
FIGS. 9A and 9B are schematic diagrams showing the relation between a reference timer and a time code in a phase modifying process.

And after completion of preroll, the CPU 10 performs the phase modification to start to count up the reproducing reference timer (not shown) and the recording reference timer (not shown) and start to operate the reproducing VTR 3 and the recording VTR 4, FIGS. 9A and 9B shows a state of phase modification when extending the program length, in which the reproduction start point and the recording start point occur at the same timing. In this connection, in the phase modification when shortening the program length, the reproduction start point precedes the recording start point by the amount of shortening the program length, as shown in FIG. 7.

In FIGS. 9A and 9B, supposing that the time code of the reproduction start point is n, and the preroll amount is 150 frames (5 seconds), the CPU 10 starts to count up the reproducing reference timer from n−150, as shown in FIG. 9A. And the CPU 10 controls the tape run speed of the reproducing VTR 3 to be increased or decreased to make the time code of the reproducing VTR 3 coincident with the count value of the reproducing reference timer at a timing prior to the reproduction start point.

And if the time code of the reproducing VTR 3 is coincident with the count value of the reproducing reference timer (at a timing of reproducing reference timer =n−4 as shown in FIG. 9A), the CPU 10 restores the tape run speed of the reproducing VTR 3 to the normal speed, and at a timing of reproducing reference timer =n, starts the reproduction of the reproducing VTR3 and to store the video signal Dv1 in the video memory 16.

At the same time, the CPU 10 starts to count up the recording reference timer from n−150, as shown in FIG. 9B. The CPU 10 controls the tape run speed of the recording VTR 4 to be increased or decreased to make the time code of the recording VTR 4 coincident with the count value of the recording reference timer at a timing prior to the recording start point.

And if the time code of the recording VTR 4 is coincident with the count value of the recording reference timer (at a timing of recording reference timer =n−5 as shown in FIG. 9B), the CPU 10 restores the tape run speed of the recording VTR 4 to the normal speed, and at a timing of time code =n, starts to record on the recording VTR4 and read the video signal Dv2 from the video memory 16.

The program length extending or shortening device 2 adjusts the program length by repeating the preroll, the phase modification and the program length extending or shortening process as one cycle by the number of edit blocks.

(3-3) Program Length Extending or Shortening Procedure

Figure 10:
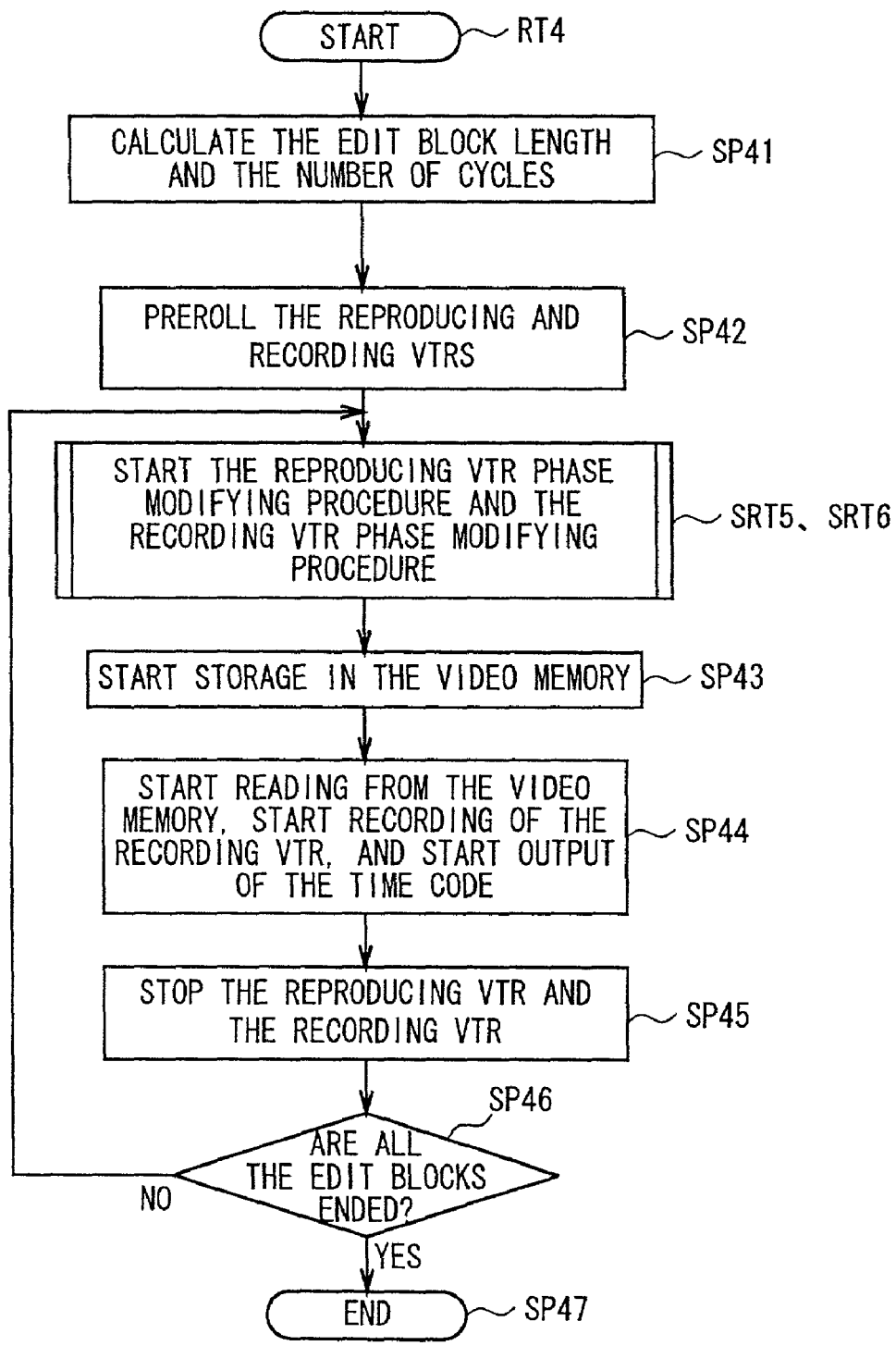
FIG. 10 is a flowchart showing a program length extending or shortening procedure.
Figure 11:
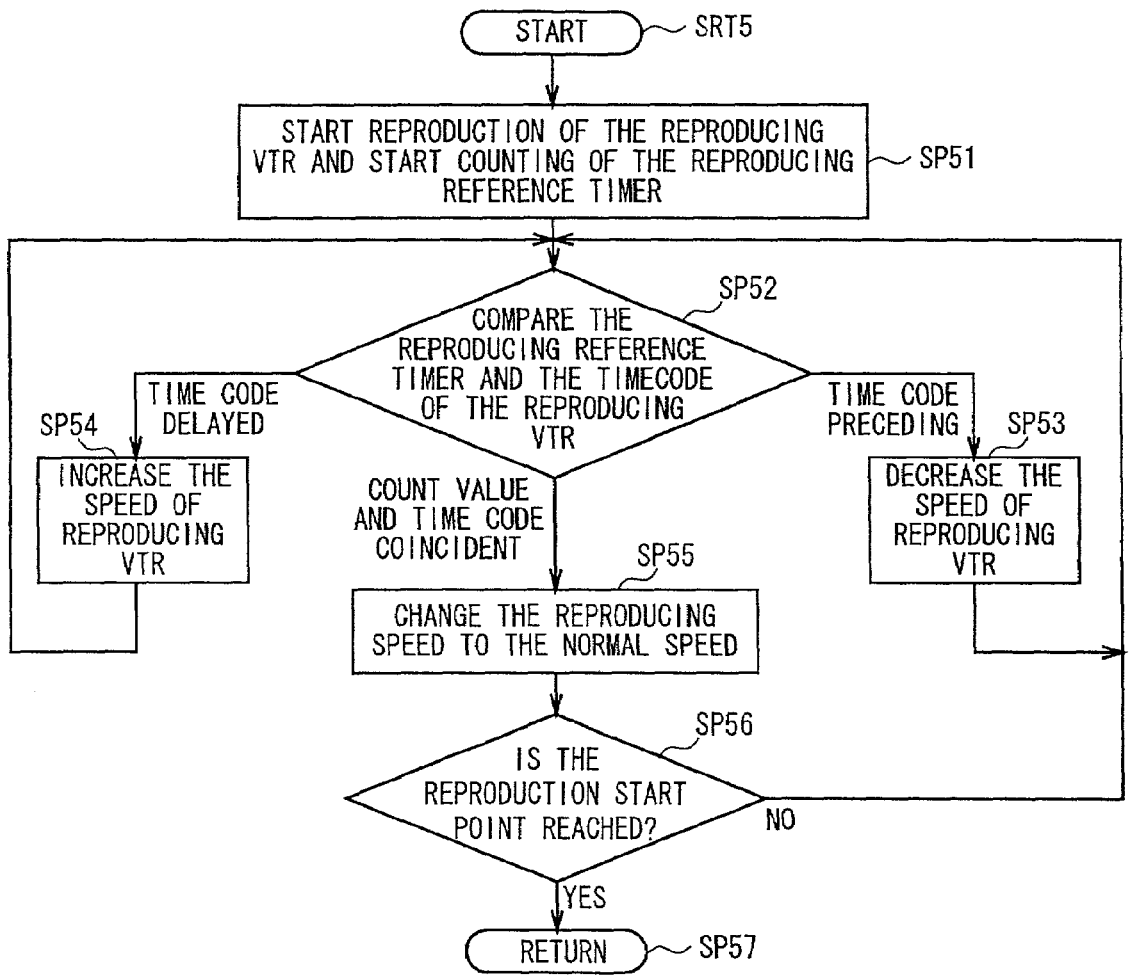
FIG. 11 is a flowchart showing a reproducing VTR phase modifying procedure.
Figure 12:
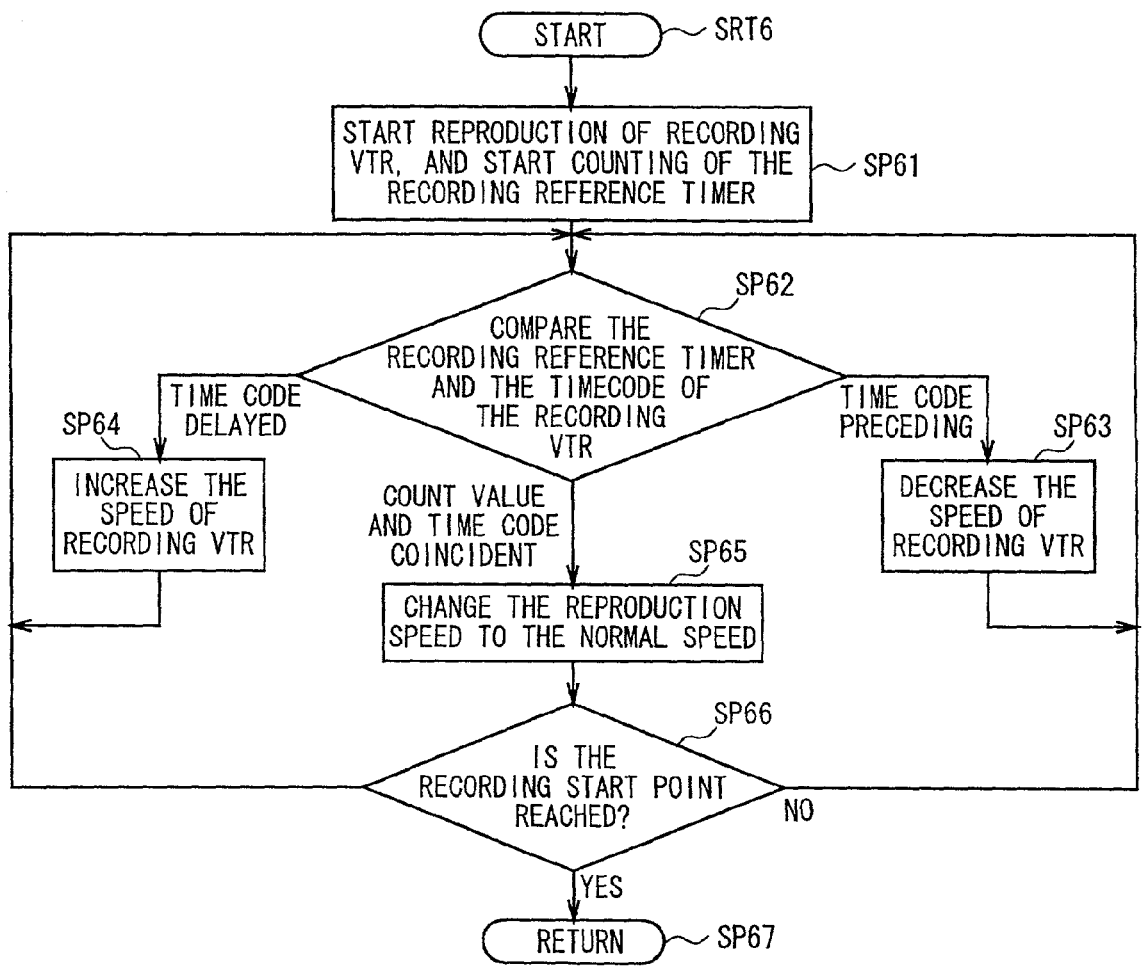
FIG. 12 is a flowchart showing a recording VTR phase modifying procedure.

Referring now to the flowcharts as shown in FIGS. 10 to 12, a processing procedure of extending or shortening the program length in the program length extending or shortening device 2 will be described below.

In the program length extending or shortening procedure as shown in FIG. 10, the program length extending or shortening device 2 enters a start step of a routine RT4, upon pressing a start button 35K (FIG. 3), and transfers to step SP41. At step SP41, the CPU 10 calculates the edit block length Le and the cycle number Cy on the basis of the material time length Tm1, the program length extending or shortening ratio N and the video memory capacity Mem, and then transfers to step SP42.

At step SP42, the CPU 10 starts to process the first edit block, and sends a control signal Cmd of instructing a preroll to the reproducing VTR 3 and the recording VTR 4 to preroll the material video tape mounted on the reproducing VTR 3 and the target video tape mounted on the recording VTR 4 to a predetermined time before the reproduction start point and the recording start point for the first edit block, respectively. And if the preroll is completed, the CPU 10 then calls the subroutines SRT5 and SRT6 to start a reproducing VTR phase modifying procedure and a recording VTR phase modifying procedure.

FIG. 11 shows the reproducing VTR phase modifying procedure. The CPU 10 enters the start step of the subroutine SRT5 to go to step SP51. At step SP51, the CPU 10 sends a control signal Cmd of instructing the reproducing VTR 3 to start the reproduction, and starts to count up the reproducing reference timer. Then the CPU 10 transfers to the next step SP52.

At step SP52, the CPU 10 makes a comparison between the count value of the reproducing reference timer and the time code of the reproducing VTR 3.

If it is determined at step SP52 that the time code of the reproducing VTR 3 precedes the count value of the reproducing reference timer, the CPU 10 transfers to step SP53, where a control signal Cmd of decreasing the reproduction speed by 10% is sent to the reproducing VTR 3. And the CPU 10 returns to step SP52.

On the contrary, if it is determined at step SP52 that the time code of the reproducing VTR 3 is behind the count value of the reproducing reference timer, the CPU 10 transfers to step SP54, where a control signal Cmd of increasing the reproduction speed by 10% to the reproducing VTR 3. And the CPU 10 returns to step SP52.

If it is determined at step SP52 that the count value of the reproducing reference timer is coincident with the time code of the reproducing VTR 3, the CPU 10 transfers to step SP55, where a control signal Cmd of restoring the reproduction speed to the normal speed to the reproducing VTR 3. And the CPU 10 transfers to step SP56.

At step SP56, the CPU 10 determines whether or not the material video tape mounted on the reproducing VTR 3 has reached the reproduction start point, on the basis of the time code of the reproducing VTR 3.

If a negative result is obtained at step SP56, this means that the material video tape has not reached the reproduction start point, and the CPU 10 returns to step SP52.

On the contrary, if an affirmative result is obtained at step SP56, this means that the material video tape has reached the reproduction start point in a state where the reproducing reference timer and the time code of the reproducing VTR 3 are coincident. Then the CPU 10 transfers to step SP57, where a return to the program length extending or shortening procedure as shown in FIG. 10 occurs.

FIG. 12 shows the recording VTR phase modifying procedure. The CPU 10 enters the start step of the subroutine SRT6, and transfers to step SP61. At step SP61, the CPU 10 sends a control signal Cmd of instructing the recording VTR 4 to start the reproduction, and starts to count the recording reference timer. Then the CPU 10 transfers to the next step SP62.

At step SP62, the CPU 10 makes a comparison between the count value of the reproducing reference timer and the time code of the reproducing VTR 3.

If it is determined at step SP62 that the time code of the recording VTR 4 precedes the count value of the recording reference timer, the CPU 10 transfers to step SP63, where a control signal Cmd of decreasing the reproduction speed by 10% is sent to the recording VTR 4. And the CPU 10 returns to step SP62.

On the contrary, if it is determined at step SP62 that the time code of the recording VTR 4 is behind the count value of the recording reference timer, the CPU 10 transfers to step SP64, where a control signal Cmd of increasing the reproduction speed by 10% to the recording VTR 4. And the CPU 10 returns to step SP62.

If it is determined at step SP62 that the count value of the recording reference timer is coincident with the time code of the recording VTR 4, the CPU 10 transfers to step SP65, where a control signal Cmd of restoring the reproduction speed to the normal speed to the recording VTR 4. And the CPU 10 transfers to step SP66.

At step SP66, the CPU 10 determines whether or not the target video tape mounted on the recording VTR 4 has reached the recording start point, on the basis of the time code of the recording VTR 4.

If a negative result is obtained at step SP66, this means that the target video tape has not reached the recording start point, and the CPU 10 returns to step SP62.

On the contrary, if an affirmative result is obtained at step SP66, this means that the target video tape has reached the recording start point in a state where the recording reference timer and the time code of the recording VTR 4 are coincident. Then the CPU 10 transfers to step SP67, where a return to the program length extending or shortening procedure as shown in FIG. 10 occurs.

At step SP43 of the program length extending or shortening procedure, the CPU 10 starts to store the video signal Dv1 in the video memory 16, and then transfers to the next step SP44.

At step SP44, the CPU 10 starts to read the video signal Dv2 from the video memory 16, and sends a control signal Cmd of instructing the start of recording to the recording VTR4, and further starts to output the reference time code Tcr to the closed caption data generating device 5 and the metadata generating device 6. Then the CPU 10 transfers to the next step SP45.

At step SP45, the CPU 10 sends a control signal Cmd of instructing the stop of reproduction and recording to the reproducing VTR3 and the recording VTR4, if the reproducing VTR3 and the recording VTR4 have reached the reproduction end point and the recording end point (i.e., end of the program length extending or shortening process for one edit block), respectively, and then transfers to step SP46.

At step SP46, the CPU 10 determines whether or not the program length extending or shortening procedure for all the blocks has been ended.

If a negative result is obtained at step SP46, this means that the program length extending or shortening procedure for all the blocks has not been ended, and the CPU 10 gets back to step SP42 to start the program length extending or shortening procedure for the next edit block.

On the contrary, if an affirmative result is obtained at step SP46, this means that the program length extending or shortening procedure for all the blocks has been ended, and the CPU 10 transfers to step SP47 to end the program length extending or shortening procedure.

(4) Operation and Effect of Embodiment

In the above constitution, the program length extending or shortening device 2 calculates a remaining set value on the basis of two set values among three set value of the start time, the end time and the program length, if the two set values are input, and calculates the program length extending or shortening ratio N on the basis of the material program length Tm1 and the target program length Tn1. And the program length extending or shortening device 2 calculates the edit block length Le and the cycle number Cy on the basis of the material program length tm1, the program length extending or shortening ratio N and the memory capacity Mem.

And the program length extending or shortening device 2 repeats the preroll, the phase modification and the program length extending or shortening process as one cycle for every edit block, if the program length extending or shortening process is started.

At this time, the program length extending or shortening device 2 extends or shortens the program length by enabling the reproducing VTR3 to operate at the normal speed, once store a video signal Dv1 of a reproducing signal D1 supplied from the reproducing VTR3 in the video memory 16, and read twice or skip the frame in accordance with the program length extending or shortening ratio N.

Concurrently, the program length extending or shortening device 2 supplies the reference time code Tcr in accordance with extending of shortening the program length to the closed caption data generating device 5 and the metadata generating device 6. And the program length extending or shortening device 2 synthesizes the closed caption data Dcc and the metadata Dmt supplied from the closed caption data generating device 5 and the metadata generating device 6 at a timing based on the reference time code Tcr with the video signal Dv2 after extending or shortening the program length, then synthesizes the video signal Dv2, the voice signal Da2, and the reference signal Dr1 to produce a recording signal D2, and enables the recording VTR4 to record at the normal speed.

With the above constitution, the video signal Dv1 is once stored in the video memory 16, and the frame is read twice or skipped in accordance with the program length extending or shortening ratio N. Therefore, the program length can be extended or shortened while the reproducing VTR3 and the recording VTR4 for compressing the image in a unit of frame are operated at the normal speed.

Also, the material program is divided into edit blocks of a length in accordance with the material program length tm1, the program length extending or shortening ratio N and the memory capacity Mem of the video memory 16 to extend or shorten the program length for every edit block. Therefore, the program length can be freely extended or shorted with a small capacity of memory.

Also, in the phase modification after preroll, the speed of the recording VTR3 and the speed of the reproducing VTR4 are adjusted on the basis of the reproducing reference timer and the count value of the recording reference timer. Therefore, the program length can be securely extended or shortened by providing synchronization between the recording VTR3 and the reproducing VTR4.

Also, the program length extending or shortening device 2 calculates a remaining set value on the basis of two set values among three set value of the start time, the end time and the program length for the material program and the target program, and further calculates the program length extending or shortening ratio on the basis of the material program length and the target program length. Therefore, the program length can be extended or shortened securely and correctly with a simple operation.

(5) Other Embodiments

In the above embodiment, the material program is divided into a plurality of-edit blocks, the number of frames being increased or decreased evenly for each edit block. However, this invention is not limited thereto, and the increased or decreased number of frames in each edit block can be changed in accordance with the program length extending or shortening ratio N, or the variation in image quality for each scene of the material program.

For example, one frame can be increased or decreased for every 100 frames in a certain edit block, or two frames increased or decreased for every 100 frames in a certain edit block, to enable minute adjustment of the amount of extending or shortening the program length.

When the program length extending or shortening ratio N is small, the material program can be extended or shortened concentratedly on the edit blocks in a specific portion of the program but not uniformly.

For example, if a program of sixty minutes is extended or shortened at a program length extending or shortening ratio of 0.5%, the whole program is extended or shortened by 18 second or 540 frame. If the program is extended or shortened at a program length extending or shortening ratio of 1% or 18 frames per edit block for the edit block of 60 seconds or 1800 frames, the number of cycles required for extending or shortening the program length is equal to 540 frames/18 frames=30 cycles. The leading part of the program is only extended or shortened by the amount of 30 cycles, and the remaining program is directly copied without extension or shortening, so that the time required for the program length extending or shortening process can be reduced.

Also, if the program is extended or shortened concentratedly on the scene with less motion such as title screen or landscape screen. The degradation in image quality owing to extending or shortening the program length can be suppressed to the minimum.

Further, in the above embodiments, the program length adjusting system 1 is constituted of the recording VTR3 and the reproducing VTR4 connected to the program length extending or shortening device 2. However, this invention is not limited thereto, and the program length adjusting system can be constituted of the program length extending or shortening device 2, the recording VTR3 and the reproducing VTR4 as a whole.

Further, in the above embodiments, the material program is reproduced from the video tape, and the target program having the program length extended or shortened is recorded on the video tape. This invention is not limited thereto, and the reproduction of the material program and the recording of the target program can be performed employing various sorts of recording medium such as an optical disk, an optical magnetic disk, or a hard disk.

With this invention as described above, the material video program is stored in storage means, the image is skipped or read twice from the storage means in accordance with the set value of the program length extending or shortening ratio. Therefore, the program length can be extended or shortened while the reproducing device and the recording device are operated at the normal speed.

The length of edit unit is set so that the amount of extending or shortening the program length per edit unit may be equal to or less than the capacity of storage means to reproduce the material video program and record the target video program in the edit unit. Therefore, the program length can be extended or shortened freely employing storage means with a small amount of capacity.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A program length extending or shortening device for extending or shortening the program length of a material video program to produce a target video program, said device comprising:
   storage means for storing an image of said material video program reproduced and supplied from a predetermined recording medium by a reproducing device;
   extending or shortening control means for extending or shortening the program length of said material video program to produce said target video program by skipping or reading duplicately an image of said material video program from said storage means in accordance with a program length extending or shortening ratio that is based on the program lengths of said material video program and said target video program;
   timing control means for controlling the speed of said reproducing device to start reproducing said material video program at a predetermined reproduction start timing on the basis of the count value of a predetermined reproducing reference timer; and
   timing control means for controlling the speed of predetermined recording means to start recording said target video program at a predetermined recording start timing on the basis of the count value of a predetermined recording reference timer.

2. The program length extending or shortening device according to claim 1
   wherein said extending or shortening control means extends or shortens the program length of said entire material video program to produce said target video program by dividing said material video program into units of editing composed of a plurality of images, and extending or shortening the program length for each of said units of editing.

3. The program length extending or shortening device according to claim 2
   wherein said extending or shortening control means chooses the number of images constituting each of said units of editing such that the amount of extending or shortening each of said units of editing is equal to or less than the capacity of said storage means.

4. A program length extending or shortening device for extending or shortening the program length of a material video program to produce a target video program, said device comprising:
   storage means for storing an image of said material video program reproduced and supplied from a predetermined recording medium by a reproducing device; and
   extending or shortening control means for extending or shortening the program length of said material video program to produce said target video program by skipping or reading duplicately an image of said material video program from said storage means in accordance with a program length extending or shortening ratio that is based on the program lengths of said material video program and said target video program;
   wherein said extending or shortening control means calculates a remaining set value on the basis of two input set values among three set values of the start time, the end time and the program length of said material video program,
   wherein said extending or shortening control means calculates a remaining set value on the basis of two input set values among three set values of the start time, the end time and the program length of said target video program, and
   wherein said extending or shortening control means calculates said program length extending or shortening ratio on the basis of the program lengths of said material video program and said target video program that are calculated.

5. A program length extending or shortening device for extending or shortening the program length of a material video program to produce a target video program, said device comprising:
   storage means for storing an image of said material video program reproduced and supplied from a predetermined recording medium by a reproducing device;
   extending or shortening control means for extending or shortening the program length of said material video Program to produce said target video program by skipping or reading duplicately an image of said material video program from said storage means in accordance with a program length extending or shortening ratio that is based on the program lengths of said material video program and said target video program;
   reference time code generating means for generating a reference time code to extend or shorten said material video program; and
   synthesis means for synthesizing the additional information with said target video program, the additional information being supplied from predetermined additional information supplying means at a timing corresponding to said reference time code.

6. A program length extending or shortening method for producing a target video program by extending or shortening the program length of a material video program, said method comprising:
   storing an image of said material video program reproduced and supplied from a predetermined recording medium by a reproducing device in storage means;
   extending or shortening the program length of said material video program to produce said target video program by skipping or reading duplicately an image of said material video program from said storage means in accordance with a program length extending or shortening ratio that is based on the program lengths of said material video program and said target video program;

controlling the speed of said reproducing device to start reproducing said material video program at a predetermined reproduction start timing on the basis of the count value of a predetermined reproducing reference timer; and controlling the speed of predetermined recording means to start recording said target video program at a predetermined recording start timing on the basis of the count value of a predetermined recording reference timer.

7. The program length extending or shortening method according to claim 6 wherein said step of extending or shortening further comprises extending or shortening the program length of said entire material video program to produce said target video program by dividing said material video program into units of editing composed of a plurality of images, and extending or shortening the program length for each of said units of editing.

8. The program length extending or shortening method according to claim 7 wherein said step of extending or shortening further comprises choosing the number of images constituting each of said units of editing such that the amount of extending or shortening each of said units of editing is equal to or less than the capacity of said storage means.

9. A program length extending or shortening method for producing a target video program by extending or shortening the program length of a material video program, said method comprising:

storing an image of said material video program reproduced and supplied from a predetermined recording medium by a reproducing device in storage means;

extending or shortening the program length of said material video program to produce said target video program by skipping or leading duplicately an image of said material video program from said storage means in accordance with a program length extending or shortening ratio that is based on the program lengths of said material video program and said target video program;

calculating a remaining set value on the basis of two input set values among three set values of the start time, the end time and the program length of said material video program;

calculating a remaining set value on the basis of two input set values among three set values of the start time, the end time and the program length of said target video program; and calculating said program length extending or shortening ratio on the basis of the program lengths of said material video program and said target video program that are calculated.

10. A program length adjusting system for producing a target video program by extending or shortening the program length of a material video program, said system comprising:

a reproducing device for reproducing said material video program recorded on a predetermined recording medium;

a program length extending or shortening device for extending or shortening the program length of said material video program to produce said target video program by storing said material video program supplied by said reproducing device in storage means, skipping or reading duplicately an image of said material video program from said storage means in accordance with a program length extending or shortening ratio that is based on the program lengths of said material video program and said target video program controlling the speed of said reproducing device to start reproducing said material video program at a predetermined reproduction start timing on the basis of the count value of a predetermined reproducing reference timer, and controlling the speed of predetermined recording means to start recording said target video program at a predetermined recording start timing on the basis of the count value of a predetermined recording reference timer; and a recording device for recording said target video program output from said program length extending or shortening device.

11. A program length extending or shortening method for producing a target video program by extending or shortening the program length of a material video program, said method comprising:

storing an image of said material video program reproduced and supplied from a predetermined recording medium by a reproducing device in storage means;

extending or shortening the program length of said material video program to produce said target video program by skipping or reading duplicately an image of said material video program from said storage means in accordance with a program length extending or shortening ratio that is based on the program lengths of said material video program and said target video program;

generating a reference time code to extend or shorten said material video program; and synthesizing the additional information with said target video program, the additional information being supplied from predetermined additional information supplying means at a timing corresponding to said reference time code.

* * * * *